(12) United States Patent
Okumura

(10) Patent No.: US 8,817,202 B2
(45) Date of Patent: Aug. 26, 2014

(54) LENS SHEET AND DISPLAY PANEL

(75) Inventor: Hiroshi Okumura, Kawasaki (JP)

(73) Assignee: NLT Technologies, Ltd., Kanagawa (JP)

( * ) Notice: Subject to any disclaimer, the term of this patent is extended or adjusted under 35 U.S.C. 154(b) by 648 days.

(21) Appl. No.: 12/636,466

(22) Filed: Dec. 11, 2009

(65) Prior Publication Data

US 2010/0149450 A1 Jun. 17, 2010

(30) Foreign Application Priority Data

Dec. 12, 2008 (JP) ................................. 2008-317033
Apr. 23, 2009 (JP) ................................. 2009-105151

(51) Int. Cl.
*G02F 1/1335* (2006.01)
*F21V 5/04* (2006.01)
*G02B 27/10* (2006.01)

(52) U.S. Cl.
USPC .............................. 349/57; 362/335; 359/619

(58) Field of Classification Search
USPC ....................... 349/57; 362/335, 336; 359/619
See application file for complete search history.

(56) References Cited

U.S. PATENT DOCUMENTS

| | | | | |
|---|---|---|---|---|
| 7,883,647 | B2 * | 2/2011 | Wang et al. ..................... | 264/1.7 |
| 2008/0068718 | A1 * | 3/2008 | Yu et al. ......................... | 359/620 |
| 2008/0095934 | A1 * | 4/2008 | Yumoto .......................... | 427/162 |
| 2009/0268128 | A1 * | 10/2009 | Yamada ........................... | 349/67 |
| 2010/0302479 | A1 * | 12/2010 | Aronson et al. ................. | 349/64 |

FOREIGN PATENT DOCUMENTS

| | | |
|---|---|---|
| CN | 101270244 A | 9/2008 |
| JP | 06-332354 A | 12/1994 |
| JP | 07-281181 A | 10/1995 |
| JP | 2000-98103 A | 4/2000 |
| JP | 2000-292858 A | 10/2000 |
| JP | 2004-280087 A | 10/2004 |
| JP | 2005-208567 A | 8/2005 |
| JP | 2007-279223 A | 10/2007 |
| JP | 2008-203430 A | 9/2008 |
| WO | 95/09372 A1 | 4/1995 |

OTHER PUBLICATIONS

ISO/FDIS 9241-303, Ergonomics of human-system interaction—Part 303: Requirements for electronic visual displays, ISO, 2008.
Office Action, dated Feb. 1, 2013, issued by the State Intellectual Property Office of P.R. China in counterpart Chinese Patent Application No. 200910258355.X.
Office Action dated Jun. 4, 2013 issued by the Japanese Patent Office in corresponding Japanese Patent Application No. 2009-105151.

* cited by examiner

*Primary Examiner* — Mark Robinson
*Assistant Examiner* — Robert Tavlykaev
(74) *Attorney, Agent, or Firm* — Sughrue Mion, PLLC

(57) ABSTRACT

To suppress malshaping in a lenticular lens sheet formed by using ultraviolet curing resin, which is caused due to an increase in the aspect ratio of cylindrical lenses and anisotropy of curing contraction. Notch sections are provided to the cylindrical lenses for sectioning the cylindrical lenses in a pseudo manner in the major axis direction (extending direction) of the cylindrical lenses so as to suppress the anisotropy of the curing contraction of the resin.

20 Claims, 28 Drawing Sheets

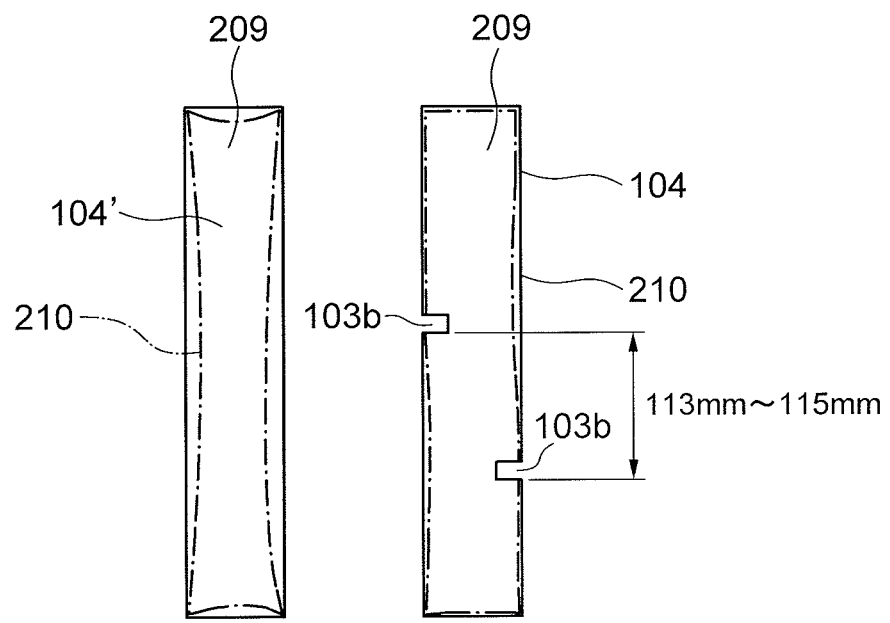

FIG. 28

| e(mm) | D(mm) | θ (deg.) |
|---|---|---|
| 50 | 200 | 29.4 |
| | 300 | 19.3 |
| | 400 | 14.4 |
| | 750 | 7.7 |
| 74 | 200 | 45.5 |
| | 300 | 29.0 |
| | 400 | 21.5 |
| | 750 | 11.4 |

LENS SHEET AND DISPLAY PANEL

CROSS-REFERENCE TO RELATED APPLICATION

This application is based upon and claims the benefit of priority from Japanese patent application No. 2008-317033, filed on Dec. 12, 2008, and Japanese patent application No. 2009-105151, filed on Apr. 23, 2009, the disclosure of which is incorporated herein in its entirety by reference.

BACKGROUND OF THE INVENTION

1. Field of the Invention

The present invention relates to a lens sheet and a liquid crystal display panel, which are used in a display device capable of displaying different images for a plurality of view points.

2. Description of the Related Art

Recently, there have been actively conducted developments for making it possible to display different images for a plurality of view points with a liquid crystal display device. For example, there have been disclosed a display device which simultaneously provides different images for a plurality of observers located in different directions as depicted in Japanese Unexamined Patent Publication H06-332354 (Paragraphs 0070-0073, FIG. 10: Patent Document 1), or a stereoscopic image display device as depicted in Japanese Unexamined Patent Publication 2005-208567 (Paragraphs 0009-0012, FIG. 41: Patent Document 2).

Both of the display devices disclosed in Patent Documents are characterized to use a lenticular lens that is formed with cylindrical lenses, and to display a plurality of images by distributing those to arbitrary different directions.

FIG. 26 shows a sectional view of a widely-used liquid crystal display panel with a plurality of view points, which uses a lenticular lens sheet.

A thin film transistor substrate (referred to as a TFT substrate) 301 and a color filter substrate (referred to as a CF substrate) 305 are laminated via a seal member 309, and liquid crystal 308 is sealed between the both substrates 301 and 305.

On a flat surface opposing to the CF substrate 305, the TFT substrate 301 includes: a thin film element region 302 on which a TFT pixel switch array, signal lines, scanning lines, pixel electrodes, a TFT driving circuit, and the like are formed; and an alignment film 304 to which rubbing processing is applied. Further, on a flat surface on the opposite side of that flat surface, the TFT substrate 301 includes a polarization plate 303.

In the meantime, on a flat surface opposing to the TFT substrate 301, the CF substrate 305 includes: a counter electrode forming layer 306 on which counter electrodes, a metal shielding film, and the like are formed; a color filter layer (referred to as a CF layer hereinafter) 307 formed with a color layer, a black matrix, an overcoat layer, and the like; and an alignment film 304 to which rubbing processing is applied. Further, on a flat surface on the opposite side of that flat surface, the CF substrate 305 includes a polarization plate 303 and a lenticular lens sheet 310.

Furthermore, a backlight module, a driving IC, a flexible print cable (referred to as FPC hereinafter), and the like are mounted, thereby completing a liquid crystal display device.

In general, the lenticular lens sheet 310 is manufactured by molding resin, glass, or the like by using a mold as disclosed in Japanese Unexamined Patent Publication 2004-280087 (Paragraph 0062: Patent Document 5) and Japanese Unexamined Patent Publication 2008-203430 (Paragraph 0025: Patent Document 6) or manufactured by using a nip roll as disclosed in Japanese Unexamined Patent Publication 2000-292858 (Paragraphs 0020-0022: Patent Document 7). In the meantime, Patent Document 3 and Patent Document 4 disclose lens sheets that can be manufactured in stable measurements at a low cost without using a mold or the like.

As shown in FIG. 27, in the widely-used lenticular lens sheet, lens-forming linear protrusions 312 and lenses 313 are provided on a substrate 311. Resin, glass, or the like is used for the substrate 311, resin is used for the linear protrusions 311, and ultraviolet curing resin, thermosetting resin, or the like is used for the lenses 313. In some cases, a liquid-repellent function depicted in WO95/09372 Publication (pp. 21-25, FIG. 8: Patent Document 3), a light-shielding function depicted in Japanese Unexamined Patent Publication H7-281181 (Paragraphs 0044-0052, FIG. 1: Patent Document 4), and the like are given to the linear protrusions 312.

However, there is normally an issue of having contraction in the ultraviolet curing resin, the thermosetting resin, and the like used for forming the lens.

The length in the major axis direction (extending direction) of each lens in the lenticular lens sheet is equivalent to the longitudinal length of a screen size of display device. Thus, when the screen size is formed in a large scale, influences of the contraction of the resin cannot be ignored. In particular, liquid crystal display devices have been continuously expanded from year to year, and liquid crystal display devices of 100 inches or more at the most have now been developed.

In the meantime, the length of the minor axis direction (pitch direction) of the lens is determined in accordance with the size of pixels in the liquid crystal display devices, so that it does not depend so much on the size of the screen.

As a result, the aspect ratio of the lens tends to be increased in accordance with the expansion of the size of the screen. In general, contraction of the resin depends largely on the shape. Thus, the anisotropy of the contraction appears greatly when the aspect ratio becomes larger, so that the stableness in the measurements tends to be deteriorated.

SUMMARY OF THE INVENTION

The present invention has been designed in view of the aforementioned issues, and it is an exemplary object of the invention to provide a lens sheet of fine measurement stableness at a low cost and a display panel of excellent visual property and display quality using that lens sheet.

The lens sheet according to an exemplary aspect of the invention is a lens sheet in which: the cylindrical lenses neighboring to each other are isolated from each other so as not to overlap one another; and notch sections are formed in each of the cylindrical lenses from one end part of a pitch direction of each of the cylindrical lenses towards other end part of the pitch direction.

It is desirable for the notch sections of the cylindrical lenses to be formed at least by avoiding mirror symmetrical positions in the cylindrical lenses. Further, it is desirable for the notch sections of the cylindrical lenses to be formed at least not to be lined continuously on a same straight line on the flat surface of the substrate except the extending direction of the cylindrical lenses.

Furthermore, it is desirable to form linear protrusions in areas between the cylindrical lenses or in the notch sections, or, to form grooves having areas between the cylindrical lenses and the notch sections as upper aperture sections.

Moreover, the linear protrusions may exhibit a liquid-repellent characteristic, and it is desirable for sidewalls of the linear protrusions to be formed to slope in such a manner that an isolated distance between two opposing sidewalls in the neighboring linear protrusions gradually increases at least at upper edge parts thereof as going away from the flat surface.

Similarly, the grooves may exhibit a liquid-repellent characteristic. Further, the substrate may be formed as a multi-layer structure having at least a layer that is in contact with the cylindrical lenses and a base layer that is in contact with the cylindrical lens contact layer, the grooves may be formed to go through the lens contact layer and reach at least into inside the base layer, width of the grooves at the base layer may be formed wider than the width thereof at the lens contact layer, and sectional shape of the grooves may be in an eave-like shape in which the lens contact layer is projected than the base layer.

Furthermore, a color filter may be provided on a flat surface of the substrate, which is on an opposite side of the flat surface where the cylindrical lenses are formed.

The display panel according to another exemplary aspect of the invention is a display panel which includes the lens sheet according to any aspects of the present invention described above.

In terms of the relation with respect to the lens sheet, particularly, it is desirable for the notch sections of the cylindrical lenses in the lens sheet to be located within a projection surface of light shielding regions that are provided at positions overlapping with pixel transistors on the display panel when viewed from a normal direction of the flat surface of the substrate.

Further, it is desirable to arrange pixel aperture sections in pairs of two in a checkerwise pattern on the display panel. Furthermore, each of the pixel aperture sections in the display panel may be formed in a trapezoid shape, and the two each of the pixel aperture sections in pairs may be continuously disposed in the extending direction of the cylindrical lenses at a constant pitch by having short sides of the pixel aperture sections opposing to each other by sandwiching light shielding regions that are provided at positions overlapping with pixel transistors.

BRIEF DESCRIPTION OF THE DRAWINGS

FIGS. 1A and 1B show illustrations of a light shielding film patterning step among manufacturing steps of a lens sheet according to an exemplary embodiment to which the present invention is applied, in which FIG. 1A is a sectional view and FIG. 1B is a plan view;

FIGS. 2A and 2B show illustrations of a lens-forming linear protrusion forming step among the manufacturing steps of the lens sheet according to the exemplary embodiment, in which FIG. 2A is a sectional view and FIG. 2B is a plan view;

FIGS. 3A and 3B show illustrations of a cylindrical lens forming step among the manufacturing steps of the lens sheet according to the exemplary embodiment, in which FIG. 3A is a sectional view and FIG. 3B is a plan view;

FIGS. 6A and 6B show conceptual diagrams regarding deformation generated in the cylindrical lens, in which FIG. 6A shows deformation generated in the cylindrical lens that is not divided in a pseudo manner and FIG. 6B shows deformation generated in the cylindrical lens that is divided in a pseudo manner;

FIGS. 7A and 7B show simplified illustrations of a structure of an LCD panel that is laminated with the lens sheet of the exemplary embodiment, in which FIG. 7A is a sectional view and FIG. 7B is a plan view;

FIGS. 8A and 8B show simplified illustrations of a structure of an LCD panel that is laminated with the lens sheet of the exemplary embodiment, in which FIG. 8A is a sectional view and FIG. 8B is a plan view;

FIGS. 11A-11D show sectional views of lens sheet manufacturing steps of another exemplary embodiment to which the present invention is applied, in which FIG. 11A is an illustration showing a forming step of a light shielding film and linear protrusions, FIG. 11B is a liquid-repellent coat layer forming step, FIG. 11C is an illustration showing a step of removing the liquid-repellent coat layer while keeping the liquid-repellent coat layer on the surface of the linear protrusions, and FIG. 11D is an illustration showing a lens forming step;

FIGS. 12A and 12B show illustrations of lens sheet manufacturing steps according to still another exemplary embodiment to which the present invention is applied, in which FIG. 12A is a sectional view showing a linear protrusion forming step and FIG. 12B is a plan view showing the linear protrusion forming step;

FIGS. 15A and 15B show simplified illustrations of a structure of an LCD panel that is laminated with the lens sheet of the exemplary embodiment, in which FIG. 15A is a sectional view and FIG. 15B is a plan view;

FIGS. 16A and 16B show simplified illustrations of a structure of an LCD panel that is laminated with the lens sheet of the exemplary embodiment, in which FIG. 16A is a sectional view and FIG. 16B is a plan view;

FIGS. 19A and 19B show illustrations of a lens-forming groove forming step among manufacturing steps of the lens sheet according to another exemplary embodiment to which the present invention is applied, in which FIG. 19A is a sectional view and FIG. 19B is a plan view;

FIGS. 20A and 20B show illustrations of a cylindrical lens forming step among manufacturing steps of the lens sheet according to exemplary embodiment to which the present invention is applied, in which FIG. 20A is a sectional view and FIG. 20B is a plan view;

FIGS. 21A-21C show conceptual diagrams of relations between a lens resin shape and an angle δ between a side wall of a groove and a substrate surface, in which FIG. 21A is a case of δ<80, FIG. 21B is a case of 80≤δ, and FIG. 21C is a case of 90<δ;

FIGS. 22A-22D show sectional views of a lens-forming groove forming step among manufacturing steps of the lens sheet according to still another exemplary embodiment to which the present invention is applied, in which FIG. 22A is an illustration showing a groove forming step, FIG. 22B is a liquid-repellent coat layer forming step, FIG. 22C is an illustration showing a step of removing the liquid-repellent coat layer while keeping the liquid-repellent coat layer on the surface of the groove, and FIG. 22D is an illustration showing a lens forming step;

FIGS. 23A and 23B show sectional views of a lens-forming groove forming step among manufacturing steps of the lens sheet according to yet another exemplary embodiment to which the present invention is applied, in which FIG. 23A is an illustration showing a groove forming step and FIG. 23B is an illustration showing a lens forming step;

FIGS. 24A-24D show sectional views of a lens-forming groove forming step among manufacturing steps of the lens sheet according to another exemplary embodiment to which the present invention is applied, in which FIG. 24A is an illustration showing a step of forming a lens contact layer and a patterning mask on a substrate, FIG. 24B shows a first half of a groove forming step, FIG. 24C is a latter half of the groove forming step, and FIG. 24D is an illustration showing a lens forming step;

FIG. 28 is a table in which a calculated result of lens contact angles θ obtained based on distance D from a lens to an observer, projection width e, and standard refractive index n.

DETAILED DESCRIPTIONS OF THE EXEMPLARY EMBODIMENTS

Next, exemplary embodiments of the invention will be described in detail by referring to some specific examples by using the accompanying drawings.

First Exemplary Embodiment

A first exemplary embodiment to which the present invention is applied will be described by referring to FIG. 1-FIG. 10. FIG. 1-FIG. 3 are illustrations showing lens sheet manufacturing steps regarding the first exemplary embodiment, and FIG. A in each drawing is a sectional view and FIG. B in each drawing is a plan view.

Figure 1A:
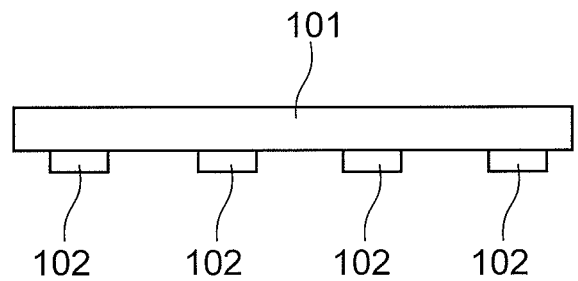
Figure 1B:
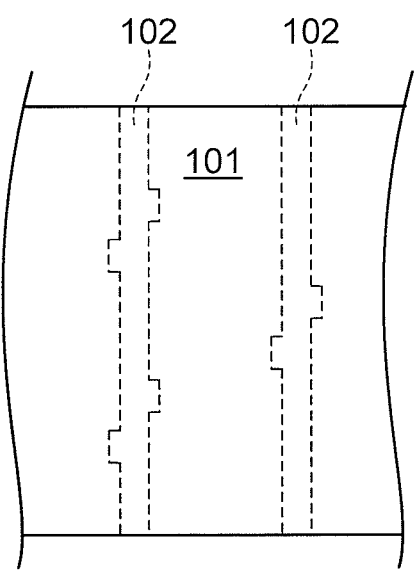

First, as shown in FIG. 1A and FIG. 1B, a light shielding film 102 is patterned on one flat surface of a substrate 101 that is on the opposite side of a flat surface where cylindrical lenses are formed, i.e., on a flat surface of the substrate 101, which is the side laminated with a display panel to be described later.

The substrate 101 is formed with glass or resin such as polyethylene naphthalate (PEN) or polyether sulfone (PES). The thickness thereof is formed as 1 mm or less, and more desirably as 0.1 mm-0.4 mm.

The light shielding film 102 is formed by metal such as Cr or Ti, or formed by black resin or the like. The light shielding film 102 is used for suppressing disturbance of display caused due to optical scattering generated in accordance with formation of linear protrusions for forming the lenses to be described later, and it is patterned to a size that is one-size lager than the external diameter of the linear protrusions used for forming the lenses according to an external shape of the linear protrusions. In a normal liquid crystal exposure process, the offset amount from the lens-forming linear protrusions towards the outer side, i.e., the outer contour of the light shielding film 102 on the basis of the external diameter of the linear protrusions for forming the lens, can be formed larger than the external diameter of the lens-forming linear protrusions in a range of about 1 μm. The light shielding film 102 may not have to be formed in a case where there is no disturbance in display that may be generated by forming the lens-forming linear protrusions.

Figure 2A:
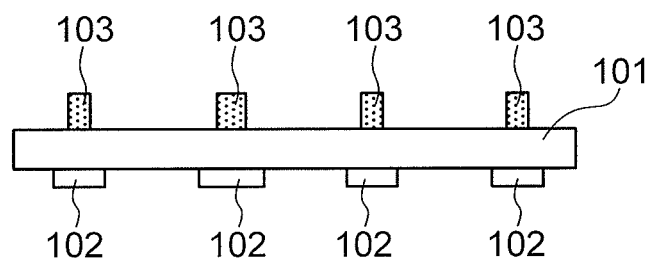
Figure 2B:
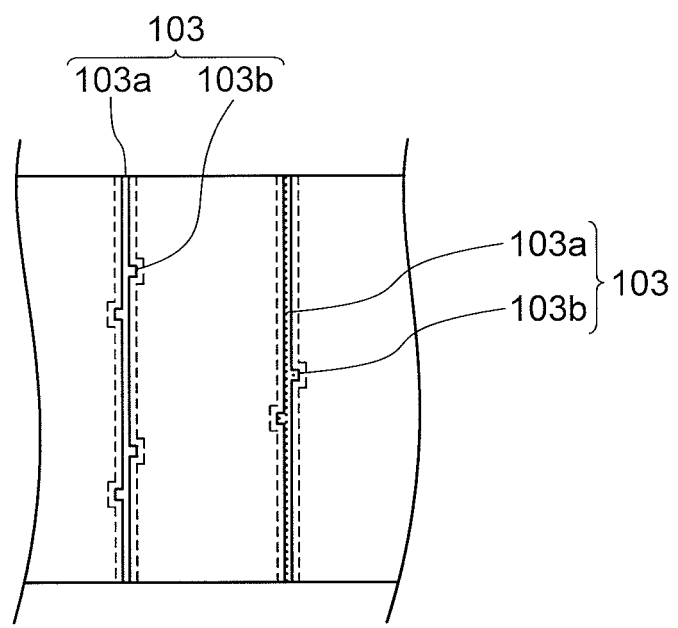

Then, as shown in FIG. 2A and FIG. 2B, the lens-forming linear protrusions (simply referred to as linear protrusions hereinafter) 103 are formed on a flat surface that is on the opposite side of the surface of the substrate 101 where the light shielding film 102 is formed, i.e., on a flat surface that is the side where cylindrical lenses are to be formed.

The linear protrusion 103 is formed with: a linear protrusion main body 103a required for separately providing, on the substrate 101, cylindrical lens forming regions for forming each of plural unit cylindrical lenses provided in parallel on the substrate 101; and protruded sections 103b required for forming notch sections for separating, in a pseudo manner, each of the unit cylindrical lenses formed on each of the cylindrical lens forming regions in the major axis direction (extending direction). The protruded section 103b has the same height as that of the linear protrusion main body 103a, and it is projected towards the left and right directions in FIG. 2A and FIG. 2B from the sidewalls of each linear protrusion main body 103a towards the sidewalls of the neighboring linear protrusion main bodies 103a.

The linear protrusion 103 including the linear protrusion main body 103a and the protruded sections 103b is formed integrally by using resin. In the exemplary embodiment, resist having a liquid-repellent characteristic is used as the material. As the ranges of dimensions of the linear protrusion main body 103a that can be formed by a typical exposure process are about 1 μm-5 μm in width and 1 μm-10 μm in height. The sectional shape of the linear protrusion main body 103a in the exemplary embodiment is a rectangular shape.

After forming the linear protrusions 103, the adhesiveness and the lyophilic property of the ultraviolet curing resin may be improved by performing ashing cleaning by using $O_2$ plasma.

Figure 3A:
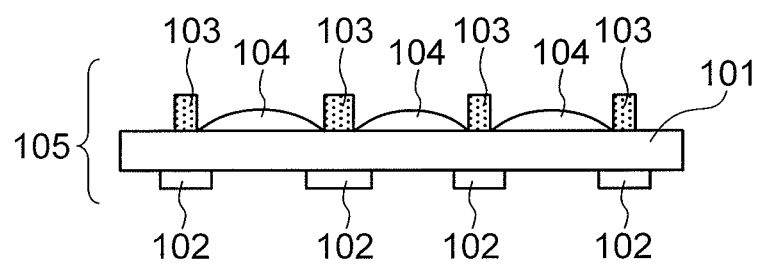
Figure 3B:
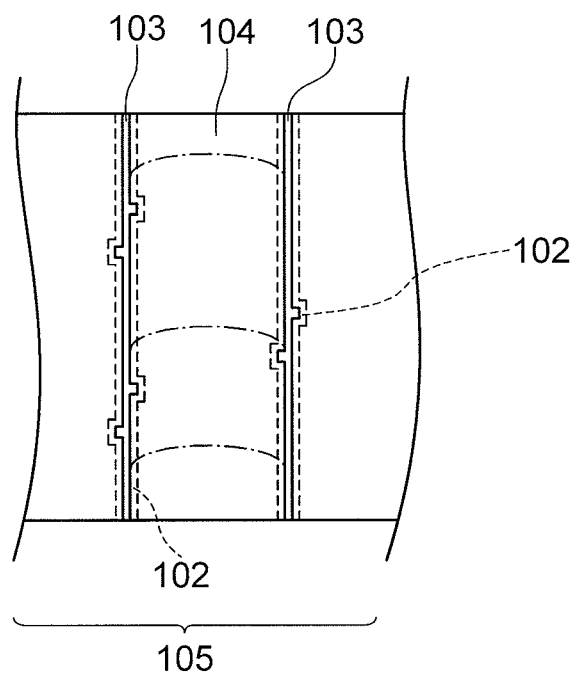

Then, as shown in FIG. 3A and FIG. 3B, the ultraviolet curing resin is dropped on the cylindrical lens forming regions that are sectioned by the neighboring linear protrusions 103 and 103, and ultraviolet rays are radiated to form unit cylindrical lenses (simply referred to as lenses hereinafter) 104.

Note here that the ultraviolet curing resin exhibits high lyophilic property for the cylindrical lens forming regions of the substrate 101, and exhibits the liquid-repellent characteristic for the linear protrusions 103. As a result, the ultraviolet curing resin is detained in the cylindrical lens forming regions between the linear protrusions 103 and 103, so that the lenses 104 having a fine curvature due to the surface tension of the resin can be formed separately from each other without overlapping one another.

Through the steps described above, a lens sheet 105 of the exemplary embodiment is completed.

Figure 4:
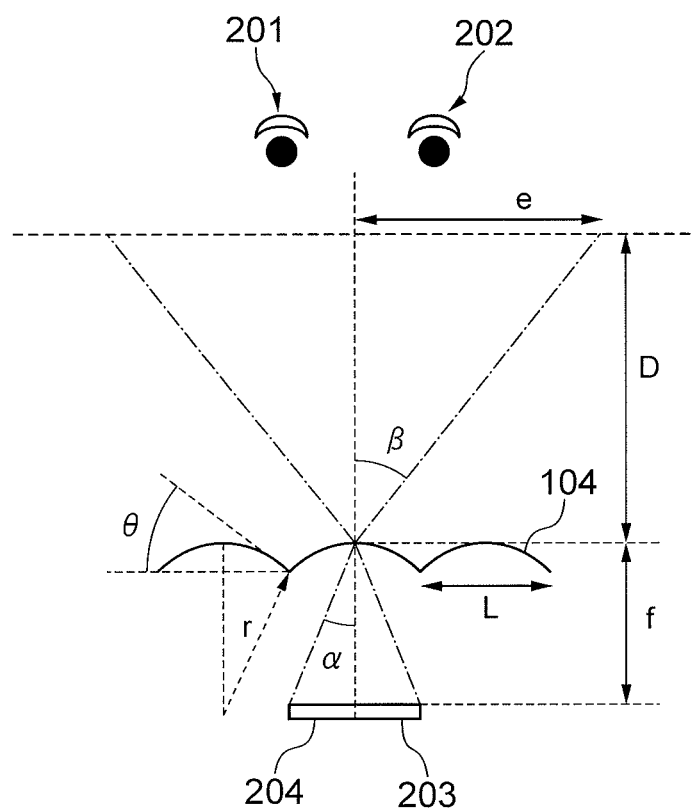
FIG. 4 is a schematic diagram showing a mechanism principle of a lenticular lens type stereoscopic display panel in a simplified manner.
Figure 5:
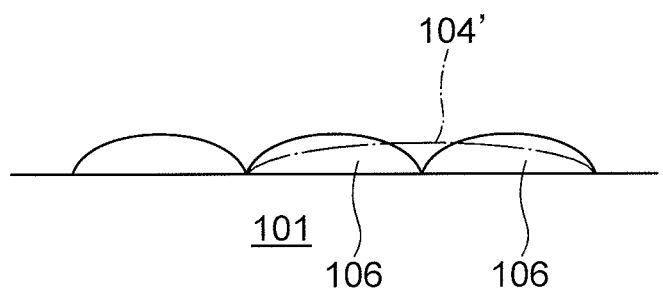
FIG. 5 is a conceptual diagram showing such a shortcoming that neighboring resins are fused into one, thereby forming a malshaped lens.

Now, a desirable shape of the lens 104 will be described by referring to an optical model of a lenticular lens type stereoscopic display panel that is shown in FIG. 4.

Reference numeral 201 in FIG. 4 indicates the right eye of an observer, and reference numeral 202 indicates the left eye of the observer. The observer having the right eye 201 and the left eye 202 visually recognizes a right-eye pixel 203 with the right eye 201 via the lens 104 and visually recognizes a left-eye pixel 204 with the left eye 202 via the lens 104. At last, the brain of the observer recognizes a synthesized image of those pixels.

A pair of right-eye pixel 203 and left-eye pixel 204 are located at the focal distance f from the lens 104, and widths of each pixel is one half of lens pitch L. It is assumed here that an incident angle for the lens 104 from each of the pixels 203 and 204 is α, and exit angle thereof is β. It is also assumed that the distance from the lens 104 to the observer is D, and the projection width of each pixel on a virtual plane that is in parallel to the lens 104 at the distance D from the lens 104 is e. A fine stereoscopic image is observed when e matches with the space between the both eyes of the observer.

The mutual relationships between each of the parameters f, α, β, L, D, and e can be written as in following Expression 1-3 based on the optical rule and geometrical relations.

$$D \times \tan \beta = e \quad \text{(Expression 1)}$$

$$f \times \tan \alpha = L/2 \quad \text{(Expression 2)}$$

$$n \times \sin \alpha = \sin \beta \quad \text{(Expression 3)}$$

Note here that n is the refractive index of the lens 104.

Next, considering the shape of the lens 104, the radius curvature r and contact angle θ between the substrate 101 and the lens 104 in a case of the lens sheet can be written as in following Expressions 4 and 5.

$$r = f \times (n-1)/n \quad \text{(Expression 4)}$$

$$r \times \sin \theta = L/2 \quad \text{(Expression 5)}$$

When Expression 5 is transformed by using Expression 1-4, a following expression can be obtained.

$$\sin \theta = n \times \tan \{\arcsin(\sin \beta/n)\}/(n-1)$$

Thus, the contact angle θ is a function of the exit angle β and the refractive index n, i.e., a function of the distance D from the lens to the observer, the projection width e, and the refractive index n.

The values regarding the distance D and the projection width e are disclosed in ISO/FDIS 9241-303 Ergonomics of human-system interaction—Part 303: Requirements for electronic visual displays (Non-Patent Document 1). It is considered necessary to have 200 mm or more for a child and 300 mm or more for an adult for the distance D, and a desirable range thereof is 400 mm-750 mm. It is depicted that 98% of the whole population falls within the range of 50 mm-74 mm for the value of e.

The refractive index n in normal resin is about 1.5 to the utmost. Thus, the calculated result of θ while assuming that n is 1.5 and the distance D and the projection width e are the aforementioned typical values is shown in a table of FIG. 28. According to this, the contact angle θ falls within a range of 7 degrees-46 degrees.

However, normally, the space between both eyes of a child is smaller than the space between both eyes of an adult (74 mm, for example). Thus, the calculation result θ that is obtained by having the space e between the eyes as 74 mm and the distance D from the lens to the observer as 200 mm, i.e., the value of the contact angle θ that is obtained while assuming a combination of the observing distance D suited for a child and the space e between both eyes of an adult, is not practical. Therefore, in order to obtain a display panel of an excellent display quality, it is appropriate to set the value of the contact angle θ to be within a range of about 7 degrees-30 degrees, and more desirable to be within a range of about 7 degrees-22 degrees.

In order to form the lenses 104 with the relatively low contact angle θ, it is necessary to have a relatively high lyophilic property between the substrate 101 and the lens-forming resin. However, when the lyophilic property is high, resin 106 for the lenses neighboring to each other is easily fused, so that it is likely to form a malshaped lens 104'.

Therefore, in order to improve the yield of the lenses, it is effective to provide the linear protrusion 103 with the liquid-repellent characteristic between the lenses 104 and 104. The linear protrusion 103 having the liquid-repellent characteristic suppresses spread of the resin on the surface of the substrate 101, so that the contact angle θ can be controlled. This makes it possible to obtain an arbitrary contact angle θ.

The contact angle θ depends on the distance between the neighboring linear protrusions 103 and 103 and the drop amount of the resin. However, the distance between the linear protrusions 103 and 103 is not deviated largely from the pixel pitch of the panel. Thus, practically, the contact angle θ is determined depending only on the drop amount of the resin.

With the exemplary embodiment, the contact angle between the substrate 101 and the lens 104 formed by dropping the ultraviolet curing resin on the cylindrical lens forming region between the linear protrusions 103 and 103 on the substrate 101 that includes the linear protrusions 103 can be made 18 degrees, under a condition where the contact angle between a flat plate and a lens formed by dropping the same ultraviolet curing resin as the material of the lens 104 on a flat plate that is formed with the same material as that of the substrate 101 and by curing the resin in a free state becomes 5 degrees and a condition where the contact angle between a flat plate and a lens formed by dropping the same ultraviolet curing resin as the material of the lens 104 on a flat plate that is formed with the same material as that of the linear protrusion 103 and by curing the resin in a free state becomes 95 degrees. This is because the use of the linear protrusions having the liquid-repellent characteristic can suppress spread of the ultraviolet curing resin on the substrate 101. Through adjusting the material of the linear protrusions 103, i.e., through adjusting the liquid-repellent characteristic, it is possible to obtain other required contact angles θ.

Further, the protruded sections 103b provided to the linear protrusion 103 have an effect of suppressing malshaping of the lenses 104. In general, 6% or more volume contraction occurs when ultraviolet curing type or thermosetting type resin is cured. However, substances do not contract in an isotropic manner, and are affected by the external shape. As shown in FIG. 6A, in a case of the lens 104' formed with resin 209 that is applied on the substrate 101 in a rectangular shape with a large aspect ratio, a contraction behavior in the centroid direction and a contraction behavior in the center point direction of each side are combined. As a result, the four corners of the lens 104' hardly change the positions after being cured, thereby being deformed to a shape 210 whose each side is deformed in arc. That is, there is generated such an issue that the contract amount becomes the maximum in the vicinity of the center point of the long sides, and the lens 104' that is in a defective shape has different optical properties in the center part and the end part.

Such issue in terms of the defective shape depends on the contraction amount and to the aspect ratio of the lens 104, so that it can be suppressed by dividing the lens 104 along the major axis. However, when the lens 104 is divided, the dividing section of the lens 104 naturally becomes an inferior section on display. In order to avoid the inferiority on the display, it is essential to shield the light at the dividing section of the lens 104. However, when the light is shielded in a relatively wide range, the numerical aperture is deteriorated.

Therefore, it can be said that pseudo division of the lens 104 by forming the notch sections by the protruded sections 103b of the linear protrusion 103 is a more effective solution to the composite issues than the complete division of the lens. With the exemplary embodiment, a fine lens 104 cannot be obtained without the protruded sections 103b, in a case where the long sides of the lens 104 exceeds 120 mm or the aspect ratio (long side/short side) exceeds 500. Based on this result, the space between the protruded sections 103b are set to 113 mm-115 mm, respectively, as shown in FIG. 6B.

Naturally, the shape of the lens 104 in the periphery of the protruded sections 103b is disturbed. However, the influence thereof is local, and the area of the display inferior section is smaller than the case of the complete division. In a case of an active matrix type display panel using TFTs, such as a liquid crystal display or an organic EL display, the region covering the TFTs is already shielded from light. Thus, if the notch light shielding region is an area that is equal to or less than the area corresponding to the TFT light shielding region, the numerical aperture is not to be deteriorated.

Figure 7A:
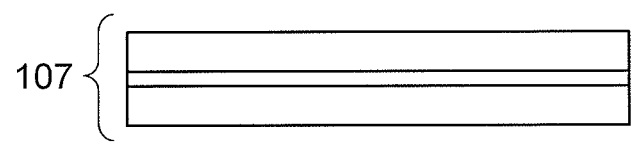
Figure 7B:
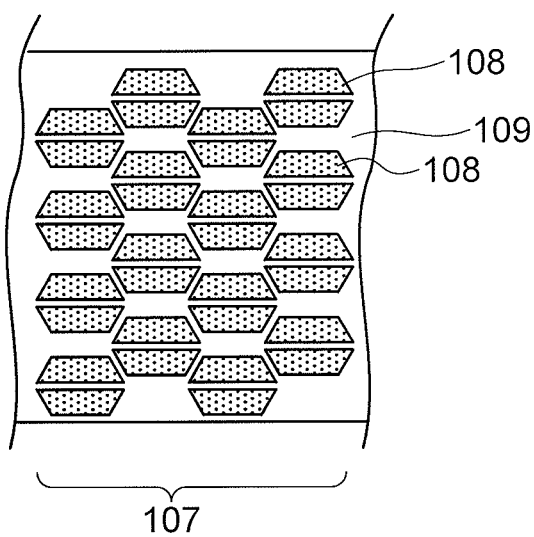

FIG. 7A shows the sectional shape of an LCD panel 107 that is laminated with the lens sheet 105, and FIG. 7B shows the plan shape thereof. A pixel aperture section 108 of the LCD panel 107 is formed in a trapezoid shape, and a thin film transistor (referred to as TFT hereinafter) as a kind of a pixel transistor is disposed on the short-side side of the trapezoid pixel aperture section 108. A TFT light shielding region 109 exists by being sandwiched between the two opposing pixel aperture sections 108. That is, on the LCD panel 107 as the display panel, the trapezoid pixel apertures parts 108 are continuously disposed in pairs of two in a checkerwise pattern at a specific interval in the extending direction of the linear protrusions 103, i.e., in the vertical direction of FIG. 7B, by having the short sides of the trapezoids opposing to each other by sandwiching the TFT light shielding region 109 that is provided at a position overlapping with the thin film transistor. With such pixel structure, as shown in the twelfth embodiment of Patent Document 2 (paragraphs 0178-0185, FIG. 37-FIG. 38), the numerical aperture of the longitudinal direction at an arbitrary position of the lateral direction of each pixel becomes constant. Thus, the distribution of the brightness at the observing position on the screen can become constant. Therefore, this is an excellent pixel structure which can suppress deterioration of the display quality, which may be caused due to the light shielding part.

Figure 8A:
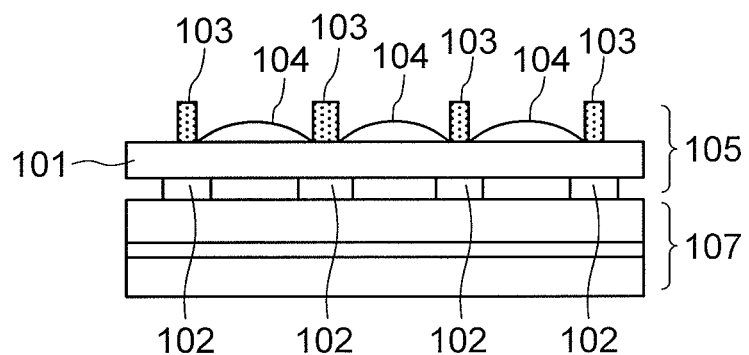
Figure 8B:
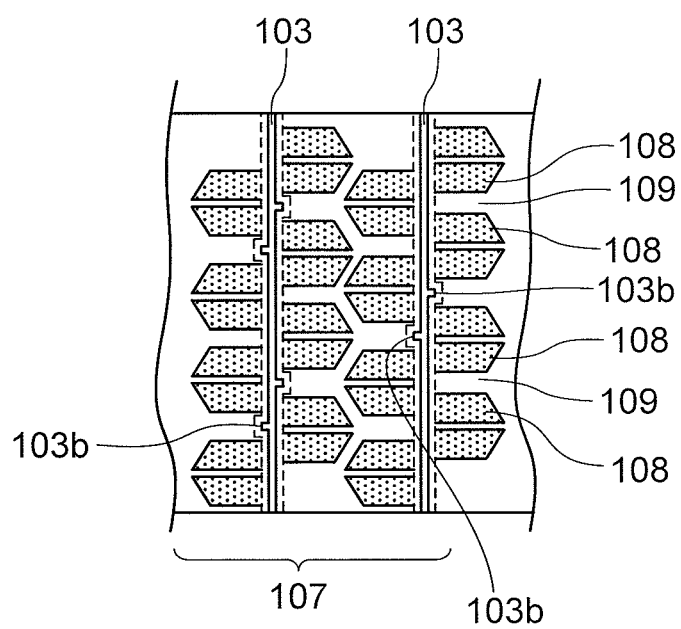

As shown in FIG. 8A and FIG. 8B, the lens sheet 105 is laminated with the LCD panel 107 by determining the position of the lens sheet 105 in such a manner that the protruded sections 103b of the linear protrusion 103 of the lens sheet 105 overlaps with the TFT light shielding region 109 of the LCD panel 107, i.e., in such a manner that the protruded sections 103b come to be at positions within the projection surface of the TFT light shielding region 109 of the LCD panel 107 as in FIG. 8B when viewed from the normal direction of a flat surface of the substrate 101. Thereby, the display panel is completed.

The area of the TFT light shielding region 109 sandwiched between the short sides of the neighboring pixel aperture sections 108 corresponds at least to two TFTs, and it is in an area that is equal to or wider than an area of about 20 μm on the short-side side and equal to or wider than 50 μm on the long-side side, while it depends also on the definition of the panel. Therefore, it is fully possible to align the protruded section 103b having the width of about 5 μm or less inside that area. For the protruded length of the protruded section 103b, although it depends on the resolution of an exposure device to be used, it is desirable to fall within a range which projects into the inside the cylindrical lens forming region to a degree with which the occurrence of malshaping of the lens 104 can be suppressed and a range that does not exceed the TFT light shielding region 109. Specifically, a range of about 1 μm-50 μm is desirable.

Figure 9:
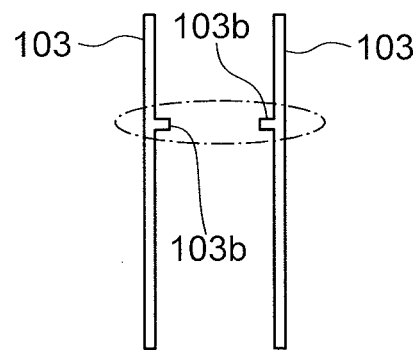
FIG. 9 is a conceptual diagram showing a shortcoming of a case where protruded sections are placed at mirror symmetrical positions of the neighboring linear protrusions.
Figure 10:
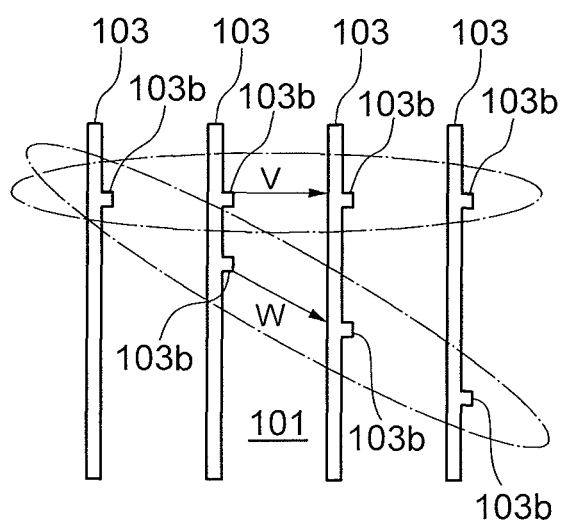
FIG. 10 is a conceptual diagram showing a shortcoming of a case where the protruded sections are continuously lined on a same straight line.

The peripheral region of the projected section 103b is shielded by the TFT light shielding region 109, so that there is almost no problem when the display panel is observed from the direct front side. However, when the display panel is observed from oblique directions, there are cases where it is recognized as display disturbance in terms of point defects (pixel defects) caused due to malshaping of the lens 104. When such point defects are formed in line, those are recognized as a band-like display unevenness, which results in deteriorating the display quality in a large amount. For example, in a case where the protruded sections 103b are disposed at mirror symmetrical positions in the neighboring linear protrusions 103 via the same lens 104 as shown in FIG. 9 or in a case where a plurality of protruded sections 103b are repeatedly disposed at translational symmetrical positions expressed as translation vector v or w as in FIG. 10, i.e., in a case where the protruded sections 103b are lined on a same straight line on the flat surface of the substrate 101 except for the extending direction (the long-side direction of the lens, which is also the vertical direction of FIG. 10) of the linear protrusions 103 themselves, it is observed as a band-like display unevenness. Therefore, it is desirable that: the planar layout of the protruded sections 103b utilized for forming the notch sections of the lens 104 has no regularity as much as possible, i.e., random; the protruded sections 103b are disposed by avoiding the mirror symmetrical positions at least in the linear protrusions 103 that are neighboring to each other by sandwiching the same lens 104; and the protruded sections 103b for forming the notch sections are disposed at least not to be lined continuously on a same straight line on the flat surface of the substrate 101 except for the extending direction of the linear protrusions 103 themselves, which is the extending direction of the lens 104.

With the exemplary embodiment described above, it is possible to provide the display panel which is excellent in the visual property and display quality and is capable of displaying different images for a plurality of view points at a low cost.

As an exemplary advantage according to the lens sheet of the present invention, the cylindrical lens is divided at several points in the major axis direction of the cylindrical lens in a pseudo manner by notch sections formed from one end part the cylindrical lens of the pitch direction towards the other end part of the pitch direction; thus, the influences of the contraction of the resin which forms the cylindrical lens can be eased, thereby making it possible to obtain a lens sheet with the excellent measurement stableness as a whole at a low cost.

Further, through laminating the lens sheet of the present invention onto a display panel, it is possible to obtain a display panel which can display different images for a plurality of view points.

Particularly, by placing the notch sections of the cylindrical lenses in the lens sheet to be located within the projection surface of the light shielding regions provided at positions to overlap with the pixel transistors of the display panel from the normal direction of the flat surface of the substrate, a slight disturbance in the lens shape in the peripheral areas of the notch sections for dividing the cylindrical lenses in a pseudo manner can be hidden by the light shielding regions for the pixel transistors. Therefore, it is possible to obtain the display panel with excellent visual property and display quality without sacrificing the numerical aperture at a low cost.

Second Exemplary Embodiment

Next, a second exemplary embodiment to which the present invention is applied will be described by referring to FIG. 11. The difference with respect to the first exemplary embodiment is a method for forming linear protrusions 110 having the liquid-repellent characteristic.

First, a light shielding film 102 is formed on the back surface of a substrate 101 as in the case of the first exemplary embodiment. On the top surface of the substrate 101, linear protrusions 110 are formed by aligning the positions with the light shielding film 102 via an $SiO_2$ film 111 that exhibits transparency. At this point, the linear protrusions 110 are formed with resin such as resist, and do not exhibit the liquid-repellent characteristic (see FIG. 11A for the above).

Figure 11A:
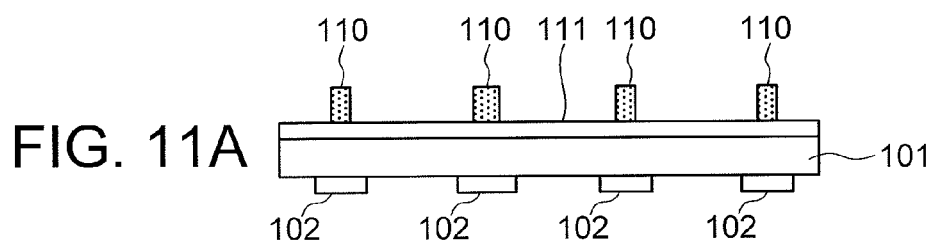
Figure 11B:
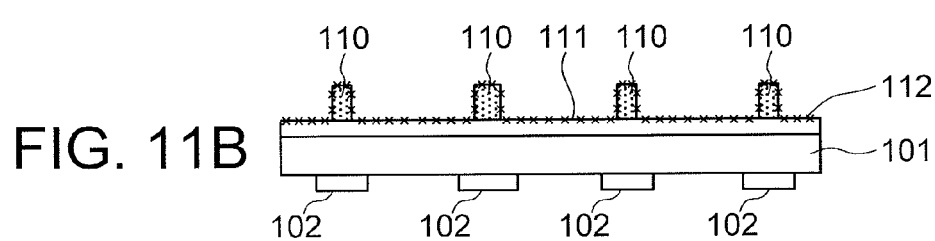
Figure 11C:
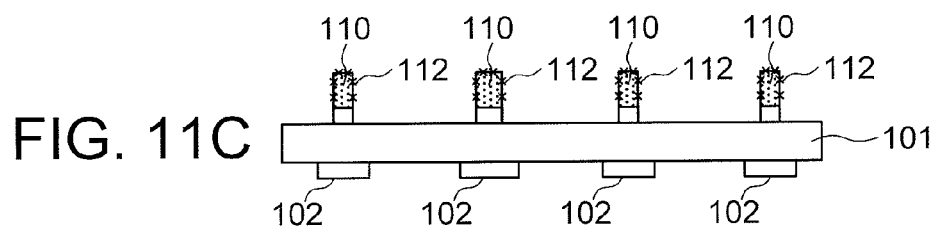

Then, a film having the liquid-repellent characteristic such as fluororesin is coated on the linear protrusions 110 to form a liquid-repellent coat layer 112 (see FIG. 11B).

Then, through cleaning the top surface of the substrate 101 with a dilute hydrofluoric acid solution, the $SiO_2$ film 111 in the region where no linear protrusion 110 is formed, i.e., the cylindrical lens forming region, is etched and removed. At this time, the liquid-repellent coat layer 112 on the $SiO_2$ film 111 is also removed simultaneously, and only the liquid-repellent coat layer 112 on the linear protrusions 110 is remained. As a result, the linear protrusions 110 having the liquid-repellent characteristic can be formed (see FIG. 11C for this).

Figure 11D:
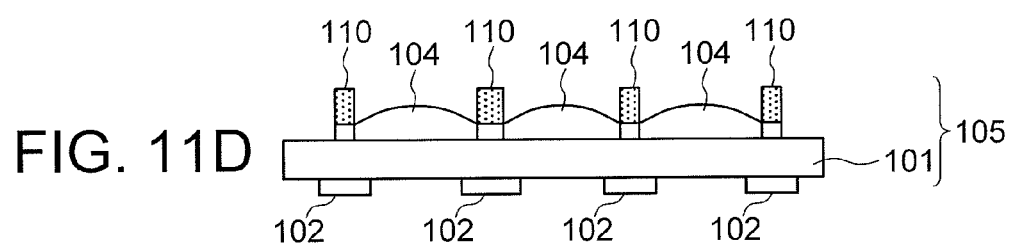

Thereafter, lenses 104 are formed by dropping resin onto the cylindrical lens forming regions as in the case of the first exemplary embodiment, thereby completing a lens sheet 105 (see FIG. 11D). In FIG. 11D, the liquid-repellent coat layer 112 is not illustrated.

Note here that the $SiO_2$ film 111 is used since it is transparent and easy to be removed. Thus, any other substances may be used as long as those substances have similar characteristics. Examples thereof may be SiN, $Al_2O_3$, ZnO, IZO, and ITO.

When forming the linear protrusions 110 having the liquid-repellent characteristic, whether to coat a liquid-repellent resin after forming the linear protrusions by using normal resin as in the case of the second exemplary embodiment or to use the liquid-repellent resist as in the case of the first exemplary embodiment may be selected by considering the cost of the materials, the manufacturing cost, and the like.

Third Exemplary Embodiment

Next, a third exemplary embodiment to which the present invention is applied will be described by referring to FIG. 12-FIG. 16. The difference with respect to the first and second exemplary embodiments is the sectional shape of the linear protrusions.

Figure 12A:
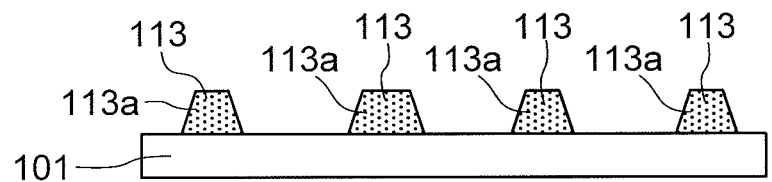
Figure 12B:
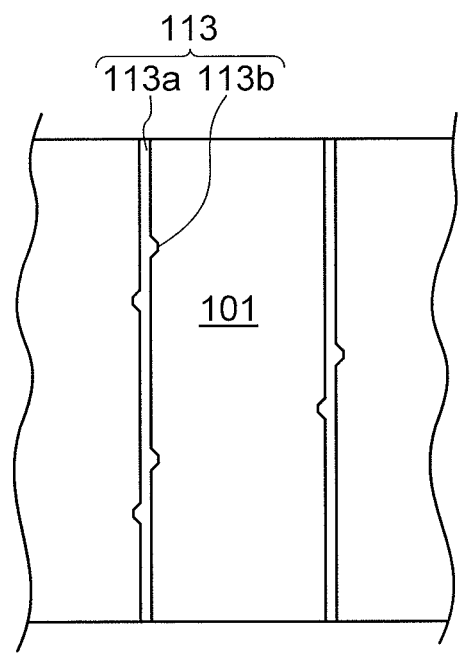

FIG. 12 shows illustrations of manufacturing steps of a lens sheet according to the third exemplary embodiment of the invention. FIG. 12A is a sectional view, and FIG. 12B is a plan view.

On the top surface of a substrate 101, linear protrusions 113 are formed with resin such as resist. As shown in FIG. 12A, the sidewalls of linear protrusion main bodies 113a of the linear protrusions 113 are formed to slope in a direction to which the distance of the isolated area between the two opposing sidewalls of the neighboring linear protrusions 113 gradually increases as the distance from the flat surface of the substrate 101 becomes larger, so that the sectional shape of the linear protrusion main body 113a as a whole is formed in a tapered shape. Instead of making the entire sidewall of the linear protrusion main body 113a slope, only the upper edge part of the sidewall of the linear protrusion main body 113a may be sloped.

Further, the linear protrusion main body 113a has the same height as that of the linear protrusion 113, and includes wedge-shaped protruded sections 113b which are protruded towards the left and right directions of FIG. 12A and FIG. 12B from the sidewalls of each linear protrusion main body 113a towards the sidewalls of the neighboring linear protrusion main bodies 113b. The height of the linear protrusion 113 is set as 3 μm, the width thereof as 2 μm, the length to the tip of the wedge shape of the protruded section 113b as 3 μm, and the pitch of placing the protruded sections 113b as 110 mm-112 mm along the longitudinal direction of the linear protrusion main body 113a. Unlike the cases of the first and second exemplary embodiments described above, no light shielding film 102 is formed on the back surface of the substrate 101. This is due to the relation with respect to the pixel layout of an LCD panel 114 that is combined therewith later.

Figure 13:
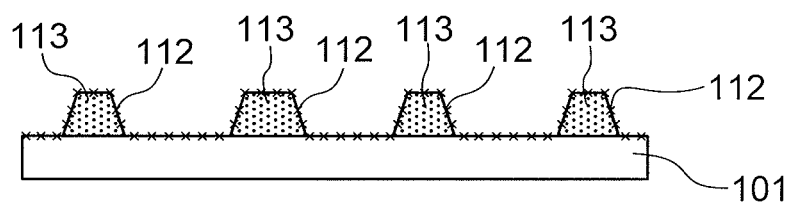
FIG. 13 is a sectional view showing a liquid-repellent coat layer forming step among the lens sheet manufacturing step of the exemplary embodiment.

Then, as shown in FIG. 13, a liquid-repellent coat layer 112 made with fluororesin or the like is formed on the top surface of the substrate 101 to provide the liquid-repellent characteristic to the linear protrusions 113.

Figure 14:
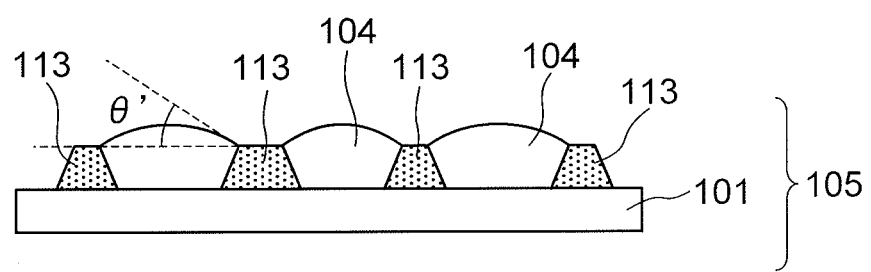
FIG. 14 is a sectional view showing a cylindrical lens forming step among the lens sheet manufacturing step of the exemplary embodiment.

Thereafter, as shown in FIG. 14, ultraviolet curing resin is dropped onto the cylindrical lens forming regions between the linear protrusions 113. In FIG. 14, the liquid-repellent coat layer 112 is not illustrated. Note here that the ultraviolet curing resin is dropped in an amount that is not to an extent detained between the linear protrusions 113 but to an extent that is sufficiently filled between the linear protrusions 113 and comes in contact with the sidewalls. The ultraviolet curing resin has a relatively larger contract angle for the linear protrusions 113 having the liquid-repellent characteristic. However, the sectional shape of the linear protrusions 113 is in a tapered faun, and the sidewalls thereof are sloped. Thus, the contact angle for the top surface of the substrate 101 on the appearance takes a small value. As described, through employing the structure in which the sidewalls of the linear protrusions 113 are sloped, the contact angle of the lens-forming resin with respect to the top surface of the substrate 101 can be controlled freely by adjusting each of two factors, i.e., the contact angle of the lens-forming resin which corresponds to the material (the liquid-repellent characteristic) of the liquid-repellent coat layer 112 formed on the linear protrusions 113, and the sloping angle of the sidewalls of the linear protrusions 113 with respect to the substrate 101.

Thereafter, ultraviolet rays are radiated to cure the resin so as to form the lenses 104. Thereby, a lens sheet 105 is completed.

With the third exemplary embodiment, the material of the liquid-repellent coat layer 112 is so selected that the contact angle with respect to the sidewalls of the linear protrusions 113 becomes 100 degrees, and the tapered angle of the sidewalls of the linear protrusions 113 is so adjusted that the slope with respect to the substrate 101 becomes 85 degrees. This makes it possible to form the lenses 104 whose substantial contact angle θ' is 15 degrees with respect to the top surface of the substrate 101.

The cylindrical lens forming region between the linear protrusions 113 is remained as being liquid-repellent. However, it may be returned to the lyophilic property by adding a step that is equivalent to that of the second exemplary embodiment. In general, the contact force with the resin is high when it has the lyophilic property. Thus, whether or not to make it back to have the lyophilic property may be selected as appropriate by considering the contact force, reliability, number of steps, manufacturing cost, and the like of the lenses 104.

Figure 15A:
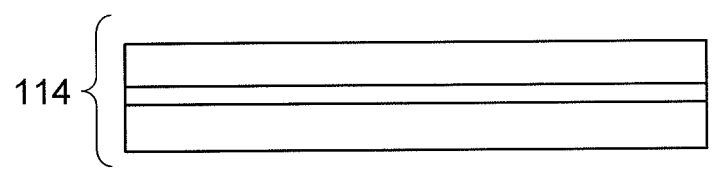
Figure 15B:
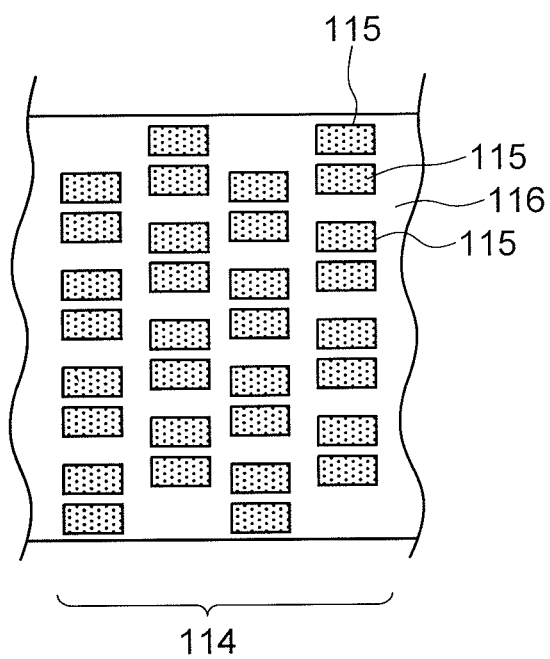

FIG. 15 shows the LCD panel 114 that is laminated with the lens sheet 105. Pixels are arranged in a checkerwise pattern as in the case of the first exemplary embodiment described above. However, the shape of pixel aperture sections 115 is a rectangular shape.

Figure 16A:
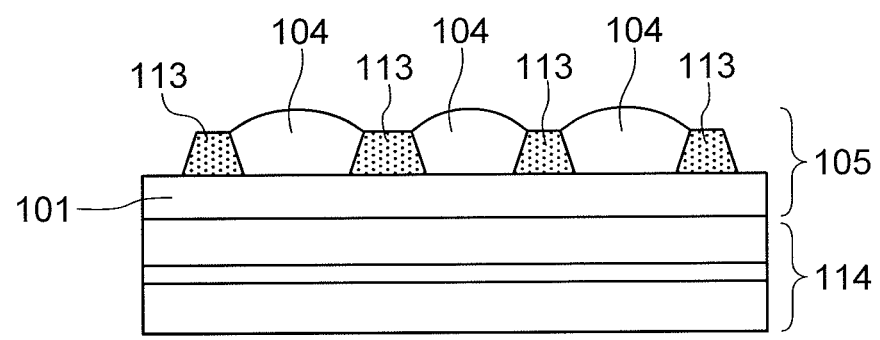
Figure 16B:
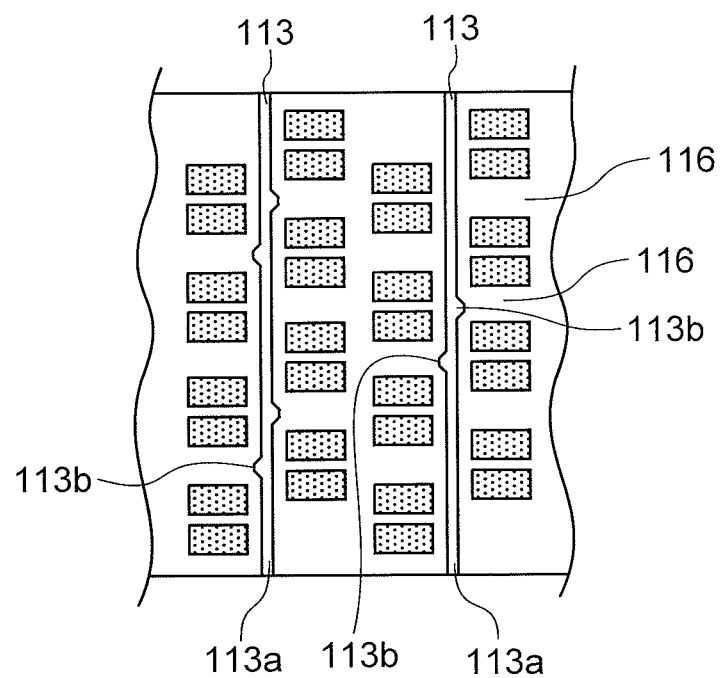

Then, as shown in FIG. 16, a display panel is completed by laminating the lens sheet 105 with the LCD panel 114. The linear protrusions 113 are aligned with the light shielding regions of the LCD panel 114. Linear protrusion main bodies 113a of the linear protrusions 113 are arranged on the light shielding regions between the pixels, and protruded sections 113b are arranged on TFT light shielding region 116.

The rectangular pixel aperture section 115 is inferior to the trapezoid pixel aperture section in terms of the viewing angle of the panel. However, the rectangular pixel aperture section 115 has such an advantage that it is unnecessary to form a light shielding film on the lens sheet 105. Thus, there is no deterioration in the numerical aperture of the panel after laminating the lens sheet, which occurs in the LCD panel 107 that has the trapezoid pixel aperture sections 108 shown in FIG. 8.

With the exemplary embodiment described above, it is possible to provide the display panel which is excellent in the visual property and display quality and is capable of displaying different images for a plurality of view points at a low cost.

Fourth Exemplary Embodiment

Next, a fourth exemplary embodiment to which the present invention is applied will be described by referring to FIG. 17 and FIG. 18.

The difference with respect to the third exemplary embodiment is that a lens sheet is unified with a color filter substrate of an LCD panel.

Figure 17:
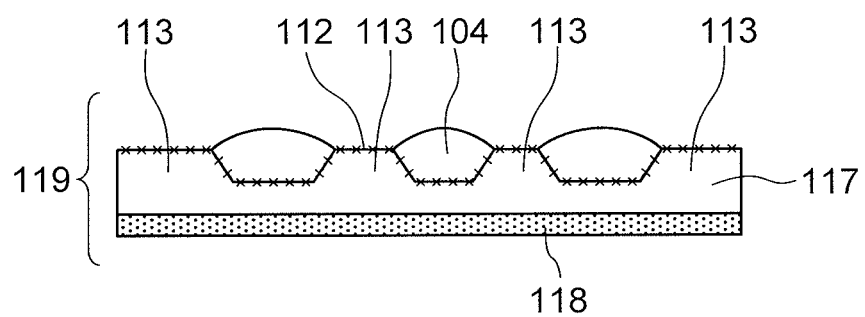
FIG. 17 is a sectional view showing a manufacturing step of a lens sheet with a color filter according to yet another exemplary embodiment to which the present invention is applied.

First, as shown in FIG. 17, cylindrical lens forming regions on the top surface of a substrate 117 are etched to form linear protrusions 113 with a tapered sectional shape as remaining parts between the cylindrical lens forming regions. Etching may be conducted by wet etching, dry etching, or the like. Then, a liquid-repellent coat layer 112 is formed on the etched surface to form the linear protrusions 113 with the tapered sectional shape having the liquid-repellent characteristic. At last, ultraviolet curing resin is dropped to fill the etched cylindrical lens forming regions, and it is cured by radiation of ultraviolet rays to form the lenses 104.

Through selecting the material of the liquid-repellent coat layer 112 so that the contact angle with respect to the sidewalls of the linear protrusions 113 formed with the remaining parts of the substrate 117 becomes 90 degrees and through setting the tapered angle of the linear protrusions 113 as 70 degrees, it is possible to form the lenses 104 whose substantial contact angle is 20 degrees with respect to the cylindrical lens forming regions of the substrate 117. Further, although not shown, the linear protrusion 113 has protruded sections which are provided on both sides of the linear protrusion main body of the linear protrusion 113 at an interval of 114 mm-117 mm, respectively.

Then, a color filter layer (referred to as a CF layer hereinafter) 118 is formed on a back surface of the substrate 117, i.e., a flat surface on the opposite side of the surface where the linear protrusions 113 are provided. The CF layer 118 is formed by variously combining a black matrix layer (light shielding layer) made with a black pigment, a metal film, or the like, and color layers of red, green, blue, white (transparent), and the like. The black matrix layer is formed by considering not only shielding of the wiring region and TFT region of a typical LCD panel but also shielding of the linear protrusions 113 as necessary.

Through the above procedure, a color filter substrate 119 (referred to as a CF substrate hereinafter) that is unified with the lens sheet can be completed.

Figure 18:
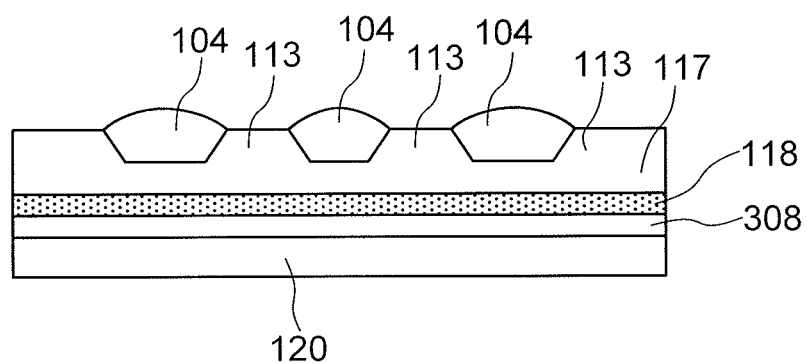
FIG. 18 is a simplified sectional view showing a display panel in which the lens sheet of the exemplary embodiment and a thin film transistor substrate are laminated.

Then, as shown in FIG. 18, the CF substrate 119 and a thin film transistor substrate (referred to as a TFT substrate hereinafter) 120 are laminated by sealing a liquid crystal 308. Thereby, a display panel is completed.

Through unifying the lens sheet and the CF substrate 119 in the manner described above, it is possible to provide a display panel that is of low cost, light in weight, and excellent in the visual property and display quality, and also is capable of displaying different images for a plurality of viewpoints.

Fifth Exemplary Embodiment

Figure 19A:
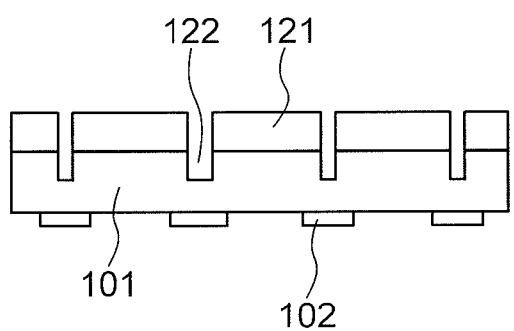
Figure 19B:
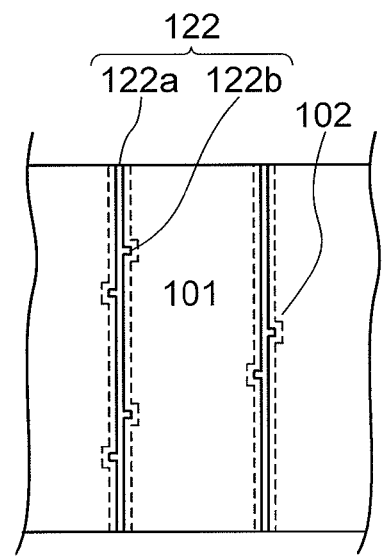

Next, a fifth exemplary embodiment to which the present invention is applied will be described by referring to FIG. 19-FIG. 21.

FIG. 19 and FIG. 20 are illustrations showing manufacturing steps of a lens sheet according to the fifth exemplary embodiment, in which FIG. A of each drawing is a sectional view and FIG. B is a plan view. The difference with respect to the first to fourth exemplary embodiment is that the areas between the isolated lenses and notch sections for controlling the shape of the cylindrical lens are formed with grooves instead of the linear protrusions.

As shown in FIG. 19, first, a light shielding film 102 is formed on the back surface of a substrate 101 as in the case of the first exemplary embodiment. A patterned mask 121 is formed on the top surface of the substrate 101, and etching is performed on the substrate 101 via the mask 121 to form lens-formation grooves (simply referred to as grooves hereinafter) 122. Note here that a glass substrate is used as the substrate 101, resist is used as the mask 121, and dry etching is employed to form the grooves 122.

The groove 122 is formed with: a groove main body 122a required for separately providing, on the substrate 101, cylindrical lens forming regions for forming each of plural unit cylindrical lenses provided in parallel on the substrate 101 by being isolated from each other at a specific pitch while having the extending direction in parallel; and protruded sections 122b required for forming notch sections for separating, in a pseudo manner, each of the unit cylindrical lenses formed on each of the cylindrical lens forming regions in the major axis direction (extending direction) of the cylindrical lens. The protruded section 122b has the same height as that of the groove main body 122a, and it is projected towards the left and right directions in FIG. 19A and FIG. 19B from the sidewalls of each groove main body 122a towards the sidewalls of the neighboring groove main bodies 122a.

The groove 122 including the groove main body 122a and the protruded section 122b is formed integrally. In the exemplary embodiment, it is formed by etching the substrate 101. As the ranges of dimensions of the groove main body 122a that can be formed by a typical exposure process and an etching process are about 1 μm-5 μm in width and 0.4 μm-5 μm in depth. In this case, the depth of the groove 122 is set as 1.2 μm, the width thereof as 2 μm, the length to the tip of the protruded section 122b as 3 μm, and the pitch of placing the protruded sections 122b as 110 mm-112 mm along the longitudinal direction (extending direction) of the groove main body 122a.

After forming the groove 122, the mask 121 is removed. Thereafter, the adhesiveness and the lyophilic property of the ultraviolet curing resin may be improved by performing ashing cleaning by using $O_2$ plasma.

Figure 20A:
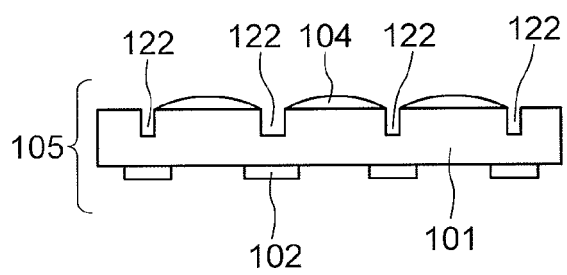
Figure 20B:
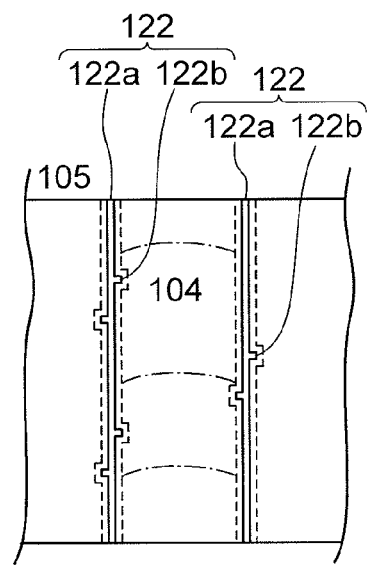

Then, as shown in FIG. 20A and FIG. 20B, the ultraviolet curing resin is dropped on the cylindrical lens forming regions that are sectioned by the neighboring grooves 122 and 122, and ultraviolet rays are radiated to form unit cylindrical lenses (simply referred to as lenses hereinafter) 104.

Note here that the ultraviolet curing resin flows on the top surface of the substrate 101. However, the flow stops at the top surface end part facing the groove 122 due to the effect of the surface tension of the ultraviolet curing resin. Thus, the ultraviolet curing resin is detained in the cylindrical lens forming regions between the grooves 122 and 122, so that the lenses 104 having a fine curvature can be formed due to the surface tension of the resin.

Further, notch sections are formed in the lenses 104 by the groove protruded sections 122b, so that the lenses 104 are divided in a pseudo manner in the major axis direction (extending direction). As a result, fine lenses 104 can be formed without being malshaped.

Through the steps described above, a lens sheet 105 of the exemplary embodiment is completed.

Thereafter, as in the cases of other exemplary embodiments described above, the LCD panel and the lens sheet 105 are laminated by overlapping the pixel light shielding regions of the LCD panel with the protruded sections 122b of the grooves 122 of the lens sheet 105. Thereby, a display panel is completed.

It is the effect of the grooves 122 to control the lens shape, which is the same as the linear protrusions 103 of the other exemplary embodiments. However, in the case of the grooves 122, the main factors for controlling the shape of the lenses 104 are the sectional shape of the grooves 122 and the surface tension of the resin. Thus, the controllability of the lens shape is lower than the case of using the liquid-repellent linear protrusions 103. Thus, when using the grooves 122, it is necessary to control the drop amount of the resin, the drop position, and the like in a delicate manner.

Figure 21A:
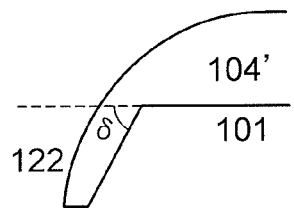
Figure 21B:
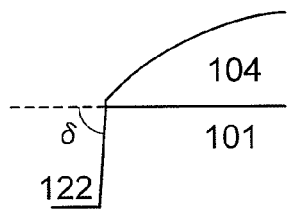
Figure 21C:
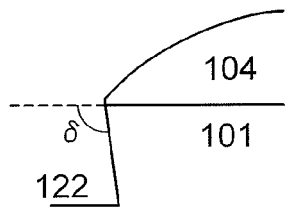

For the sectional shape of the grooves 122, as shown in FIG. 21, if the angle δ between the sidewalls of the groove 122 and the top surface of the substrate 101 is moderate, the resin does not stop at the end part of the top surface of the substrate 101 and flows into the groove 122. As a result, malshaped lenses 104' are to be formed (see FIG. 21A). As the conditions for the angle δ in order to stop the resin at the end part of the top surface of the substrate 101, it is desirable to be roughly 80 degrees or more and may be in a reverse tapered shape of 90 degrees or more, even though it depends on the lyophilic property of the substrate surface, viscosity of the resin, and the like (see FIG. 21B and FIG. 21C). Furthermore, the sectional shape formed with the bottom part of the groove 122 and the sidewall thereof may not necessarily have to be a rectangular shape, as long as the angle δ is being controlled. In general, when the grooves 122 are formed by wet etching, the sectional shape formed with the bottom part of the groove 122 and the sidewall thereof forms a circular arc due to the isotropy of the wet etching. However, it is easy to make the angle δ be 80 degrees or more by using the mask 121.

Sixth Exemplary Embodiment

Next, a sixth exemplary embodiment to which the present invention is applied will be described by referring to FIG. 22. The difference with respect to the fifth exemplary embodiment is that the grooves exhibit the liquid-repellent characteristic.

Figure 22A:
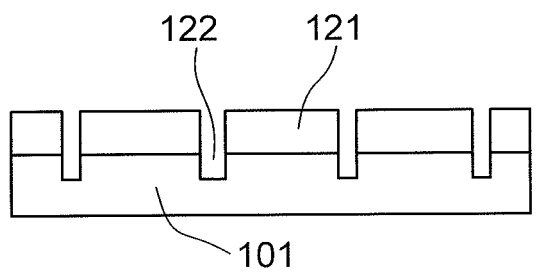

First, as in the case of the fifth exemplary embodiment, grooves 122 are formed on the top surface of a substrate 101 by performing etching via a mask 121 made with resist (see FIG. 22A). Although not shown in FIG. 22, a light shielding film 102 may be formed on the back surface of the substrate 101.

Figure 22B:
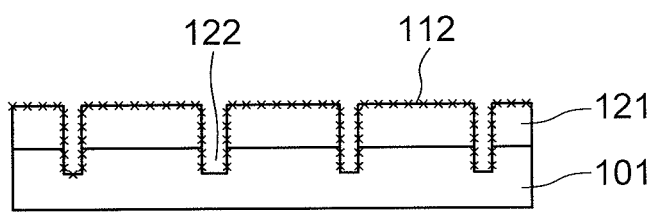
Figure 22C:
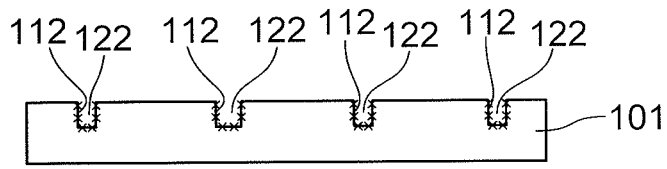

Then, a film having the liquid-repellent characteristic such as fluororesin is coated on the substrate 101 over the mask 121 to form a liquid-repellent coat layer 112 (see FIG. 22B).

Thereafter, the top surface of the substrate 101 is treated with a resist peeling liquid to peel and remove the mask 121. At this time, the liquid-repellent coat layer 112 on the mask 121 is removed simultaneously, and only the liquid-repellent coat layer 112 on the top surface of the grooves 122 is remained. As a result, the grooves 122 having the liquid-repellent characteristic can be formed (see FIG. 22C for the above).

Figure 22D:
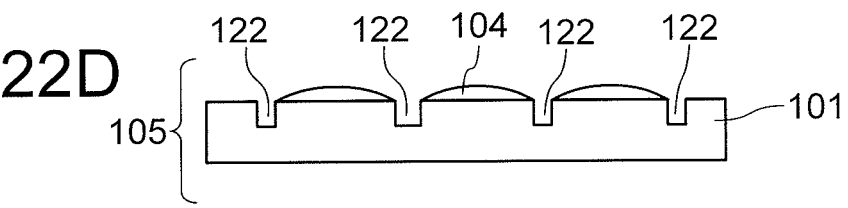

Thereafter, lenses 104 are formed by dropping resin on the cylindrical lens forming regions in the same manner as the case of the fifth exemplary embodiment, thereby completing a lens sheet 105 (see FIG. 22D). The liquid-repellent coat layer 112 is not illustrated in FIG. 22D.

With this exemplary embodiment, the top surface of the grooves 122 has the liquid-repellent characteristic because of the liquid-repellent coat layer 112, so that controllability of the shape of the lenses 104 is improved. As a result, yield of the lens sheet can be improved. Further, the condition of the angle δ formed between the sidewalls of the grooves 122 and the top surface of the substrate 101 can be eased slightly. Thus, unlike the case of the above-described fifth exemplary embodiment in which it is considered desirable to have the angle δ as 80 degrees or more, the resin can be stopped at the end part of the top surface of the substrate 101 by having the angle δ as 77 degrees or more.

Whether or not to provide the liquid-repellent characteristic to the grooves 122 may be selected by considering the property of the resin for the lenses and the manufacturing cost and the like including the material cost and yield.

It is also possible to provide the liquid-repellent characteristic to the entire top surface of the substrate 101 including the grooves 122 through coating the liquid-repellent coat layer 112 after forming the grooves 122 and removing the mask 121. However, in that case, it is difficult to obtain relatively small lens contact angles θ such as those shown in FIG. 28. Particularly, when it is desired to obtain a large lens contact angle θ under a special condition that does not correspond to the typical conditions shown in FIG. 28, the whole top surface of the substrate 101 may be provided with the liquid-repellent characteristic.

Seventh Exemplary Embodiment

Figure 23A:
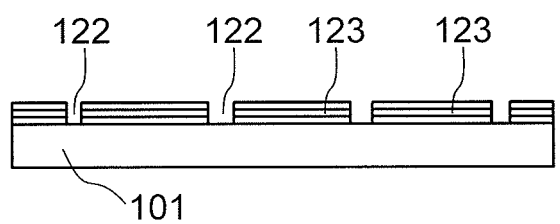

Next, a seventh exemplary embodiment to which the present invention is applied will be described by referring to FIG. 23. The difference with respect to the sixth exemplary embodiment is a method for forming the grooves.

First, photosensitive acryl resin is applied to a thickness of 2 μm on the top surface of the substrate 101, and it is patterned by exposure to form a lens contact layer 123. The regions from which the photosensitive resin is removed by the exposure form grooves 122 with a depth of 2 μm (see FIG. 23A for the above). Although not shown in FIG. 23, a light shielding film 102 may be formed on the back surface of the substrate 101.

Figure 23B:
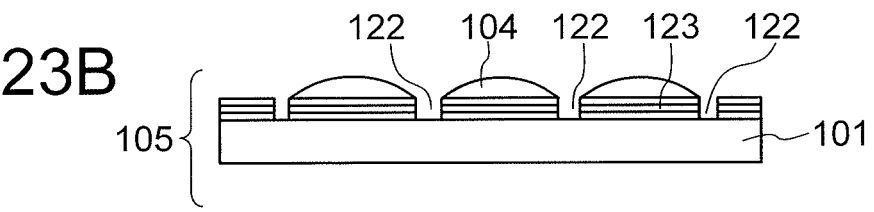

Then, lens-forming resin is dropped on the top surface of the lens contact layer 123 to form lenses 104, thereby completing a lens sheet 105 (see FIG. 23B).

With this exemplary embodiment, the grooves can be formed by only a single resin-application and exposure process. Thus, it is possible to form the lens sheet 105 by a smaller number of processes than the other exemplary embodiments which form the grooves by etching. Further, a reverse tapered shape having the angle δ of 90 degrees or more can be formed easily by executing exposure from the back surface of the substrate at the time of performing the exposure process.

Eighth Exemplary Embodiment

Next, an eighth exemplary embodiment to which the present invention is applied will be described by referring to FIG. 24. The difference with respect to the seventh exemplary embodiment is a method for forming the grooves.

First, a lens contact layer 123 made with SiN is deposited to a thickness of 50 nm on the top surface of a glass substrate 101 by a plasma CVD method. Thereafter, a mask 121 made with resist is patterned. At this time, the aperture width of the mask 121 to be the groove width later is set as 3 μm (see FIG. 24A for the above). Although not shown in FIG. 24, a light shielding film 102 may be formed on the back surface of the substrate 101.

Figure 24A:
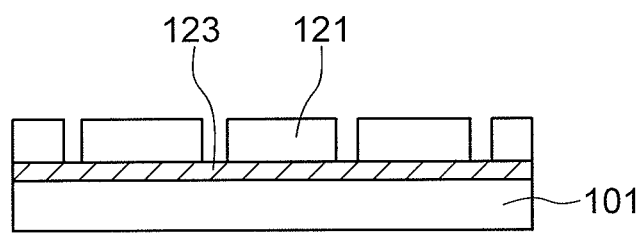
Figure 24B:
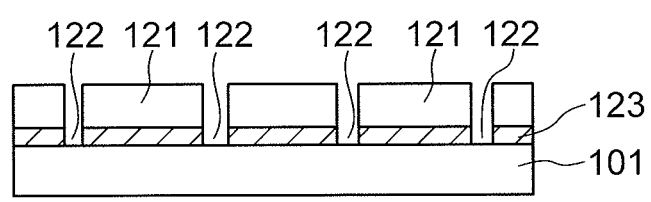
Figure 24C:
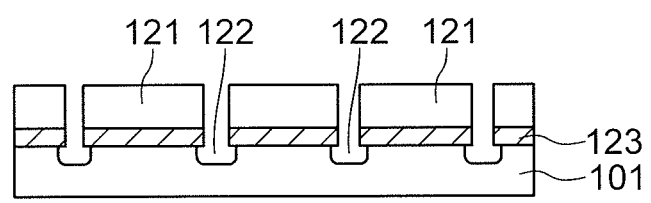

Then, a part of grooves 122 is formed by removing the lens contact layer 123 located at the aperture sections of the mask 121 by a dry etching method (see FIG. 24B).

Thereafter, the grooves 122 are completed by performing wet etching on the substrate 101 by using a solution containing hydrofluoric acid, such as a buffered hydrofluoric acid solution. At this time, etching is performed in such a manner that the depth of the grooves 122 at the deepest part becomes 2.5 μm. Due to the isotropy of the wet etching, the substrate 101 is also etched in the flat surface direction for 2.5 μm, and the width of the grooves 122 on the top surface of the substrate 101 becomes 5 μm. At this time, the lens contact layer 123 made with SiN is hardly etched in the flat surface direction of the substrate 101, since the etching rate thereof for hydrofluoric acid is smaller than that of the glass substrate. As a result, the sectional shape of the groove 122 forms a pseudo reverse tapered shape in which the end of the lens contact layer 123 is projected like an eave from the end part of the top surface of the substrate 101 (see FIG. 24C for the above).

Figure 24D:
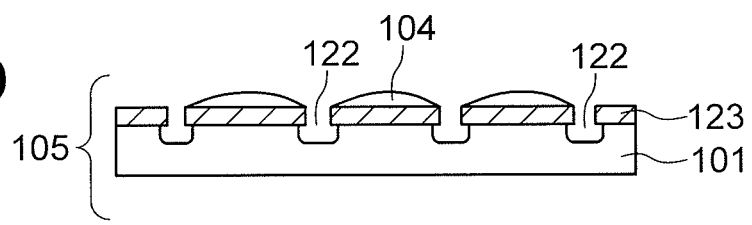

Thereafter, the mask 121 is removed and lens-forming resin is dropped to the top surface of the lens contact layer 123 to form lenses 104, thereby completing a lens sheet 105 (see FIG. 24D).

Regarding the etching rate for an etching chemical (solution or gas) used in the step of forming the grooves 122, the etching rate of the lens contact layer 123 in this exemplary embodiment is made smaller than the etching rate of the layer located directly under the lens contact layer 123 so as to obtain the pseudo reverse tapered sectional shape of the grooves.

Figure 25:
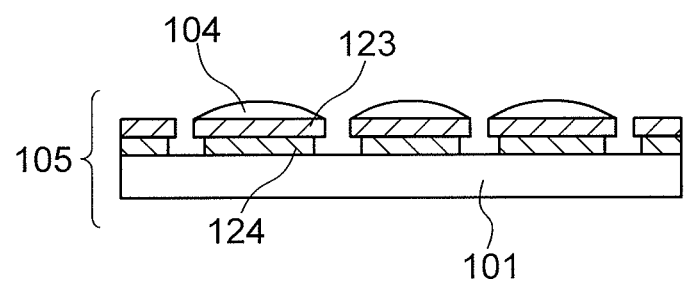
FIG. 25 is a sectional view of a lens sheet that is a modification example of the exemplary embodiment.
Figure 26:
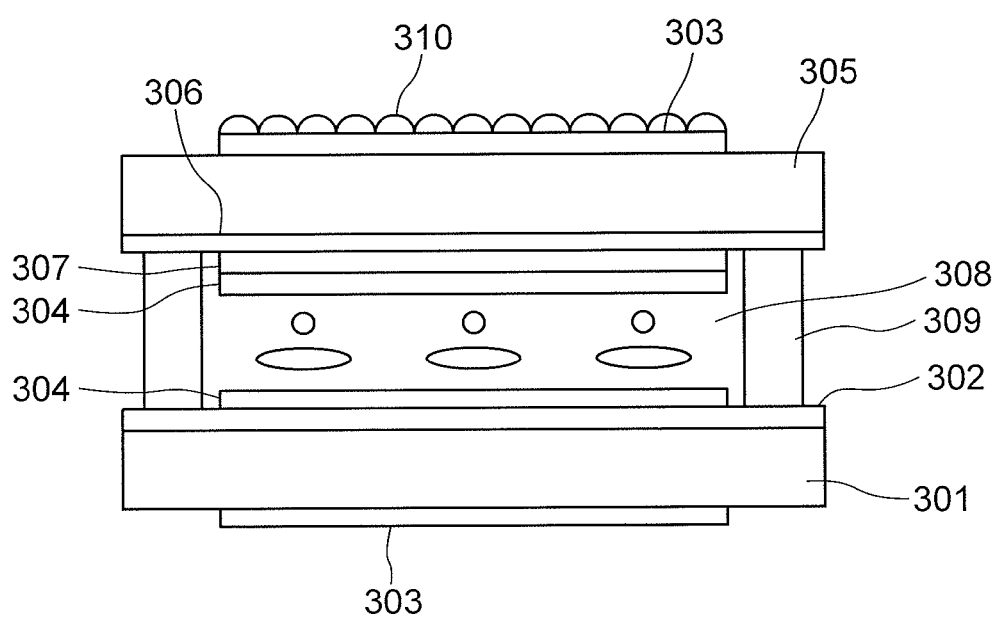
FIG. 26 is a simplified sectional view of a structure of a widely-used liquid crystal display panel.
Figure 27:
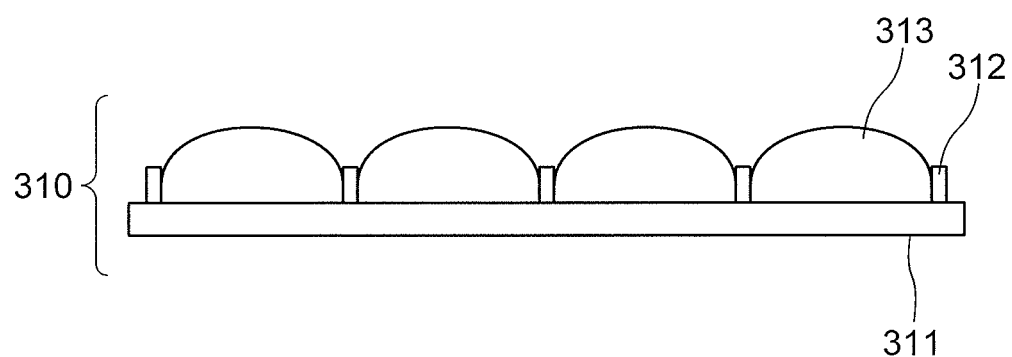
FIG. 27 is a simplified sectional view of a structure of a widely-used lenticular lens sheet.

Therefore, as shown in FIG. 25, as a modification example of the eighth exemplary embodiment, it is possible to employ a structure in which a sacrificial layer 124 whose etching rate is larger than that of the lens contact layer 123 is interposed between the substrate 101 and the lens contact layer 123. For example, combinations of the lens contact layer 123, the sacrificial layer 124, and the etching chemical may be "an SiN film, an $SiO_2$ film, and a hydrofluoric acid solution", "an $SiO_2$ film, a ZnO film, and an organic alkali solution", or the like.

In the above, the case of separately forming the cylindrical lens forming regions on the substrate 101 by forming the linear protrusions 103 each of which includes the linear protrusion main body 103a and the protruded sections 103b on the substrate 101, dropping the resin on the cylindrical lens forming regions, and controlling the contact angle θ of the lenses 104 with respect to the substrate 101 by utilizing the tapered angle of the sidewalls of the linear protrusions 103 and the liquid-repellent characteristic of the sidewalls of the linear protrusions 103 has been described in detail as the first-fourth exemplary embodiments. In the meantime, the case of separately forming the cylindrical lens forming regions on the substrate 101 by forming the grooves 122 each of which includes the groove main body 122a and the protruded sections 122b on the substrate 101, dropping the resin on the cylindrical lens forming regions, and controlling the contact angle θ of the lenses 104 with respect to the substrate 101 by utilizing the angle formed between the sidewalls of the grooves 122 and the top surface of the substrate 101, the liquid-repellent characteristic of the sidewalls of the grooves 122, and the surface tension of the resin has been described in detail as the fifth-eighth exemplary embodiments.

The technical spirit which reduces arc-like contraction deformation of the long sides on both sides of the cylindrical lenses 104 caused by separating the cylindrical lenses 104 in the major axis direction (extending direction) in a pseudo manner by forming notch sections in the cylindrical lenses 104 that are formed in the cylindrical lens forming regions on the substrate 101 is substantially the same in the first-fourth exemplary embodiments and in the fifth-eighth exemplary embodiments.

Further, in the lens sheet 105 formed by applying any of the structures disclosed as the first-eighth exemplary embodiments, the notches from one end part in the pitch direction of each cylindrical lens 104 towards the other end of the pitch direction are formed in the cylindrical lenses 104 as shown in FIG. 6B, for example. Furthermore, each of the cylindrical lenses 104 is arranged in parallel by keeping a constant pitch in such a manner that the mutually neighboring cylindrical lenses 104 are isolated from each other without overlapping one another by the linear protrusion main body 103a of the linear protrusion 103 or the groove main body 122a of the groove 122 as shown in FIG. 3A, FIG. 3B and FIG. 20A, FIG. 20B, for example.

In the first-fourth exemplary embodiments among the whole exemplary embodiments, the linear protrusion main body 103a that forms the main part of the linear protrusion 103 is located between the cylindrical lens 104 and the cylindrical lens 104 neighboring to each other on the completed lens sheet 105, i.e. the area between the isolated cylindrical lenses 104, and the protruded section 103b that forms a part of the linear protrusion 103 is located in the notch section of the cylindrical lens 104.

Similarly, in the fifth-eighth exemplary embodiments, the groove main body 122a that forms the main part of the groove 122 having the area between the isolated cylindrical lenses 104 as the upper aperture section is located between the cylindrical lens 104 and the cylindrical lens 104 neighboring to each other on the completed lens sheet 105, i.e., located in the area between the isolated cylindrical lenses 104, and the protruded section 122b that is a part of the groove 122 having the notch section as the upper aperture section is located in the notch section of the cylindrical lens 104.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A lens sheet, comprising a substrate and a plurality of cylindrical lenses arranged in parallel at a constant pitch on a flat surface of the substrate by having lens extending directions in parallel to each other, wherein:
the cylindrical lenses neighboring to each other are isolated from each other so as not to overlap one another; and
notch sections are formed at one end part of a pitch direction of each of the cylindrical lenses from the one end part of the pitch direction of each of the cylindrical lenses towards other end part of the pitch direction in such a manner that the notch sections do not reach the other end part of the pitch direction of the cylindrical lenses, and a respective length of each of the notch sections in the lens pitch direction is greater than a corresponding length of each of the notch sections in a lens extending direction.

2. The lens sheet as claimed in claim 1, wherein
the notch sections of the cylindrical lenses are formed at least by avoiding mirror symmetrical positions in the cylindrical lenses.

3. The lens sheet as claimed in claim 1, wherein
the notch sections of the cylindrical lenses are formed at least not to be lined continuously on a same straight line on the flat surface of the substrate except the extending direction of the cylindrical lenses.

4. The lens sheet as claimed in claim 1, wherein
linear protrusions are formed in areas between the cylindrical lenses or in the notch sections.

5. The lens sheet as claimed in claim 4, wherein
the linear protrusions exhibit a liquid-repellent characteristic.

6. The lens sheet as claimed in claim 4, wherein
sidewalls of the linear protrusions are formed to slope in such a manner that an isolated distance between two opposing sidewalls in neighboring linear protrusions gradually increases at least at upper edge parts thereof as going away from the flat surface.

7. The lens sheet as claimed in claim 1, wherein
grooves having areas between the cylindrical lenses and the notch sections as upper aperture sections are formed.

8. The lens sheet as claimed in claim 7, wherein
the grooves exhibit a liquid-repellent characteristic.

9. The lens sheet as claimed in claim 7, wherein
the substrate is formed as a multi-layer structure having at least a layer that is in contact with the cylindrical lenses and a base layer that is in contact with the cylindrical lens contact layer;
the grooves are formed to go through the lens contact layer and reach at least into inside the base layer;
a width of the grooves at the base layer is formed wider than a width thereof at the lens contact layer; and
a sectional shape of the grooves is in an eave-like shape in which the lens contact layer is projected on the base layer.

10. The lens sheet as claimed in claim 1, comprising a color filter provided on a flat surface of the substrate, which is on an opposite side of the flat surface where the cylindrical lenses are formed.

11. A display panel, comprising the lens sheet as claimed in claim 1.

12. The display panel as claimed in claim 11, wherein
the notch sections of the cylindrical lenses are located within a projection surface of light shielding regions that are provided at positions overlapping with pixel transistors on the display panel when viewed from a normal direction of the flat surface of the substrate.

13. The display panel as claimed in claim 11, wherein
pixel aperture sections in pairs of two are arranged in a checkerwise pattern on the display panel.

14. The display panel as claimed in claim 13, wherein:
each of the pixel aperture sections in the display panel is formed in a trapezoid shape; and the pairs of pixel aperture sections are continuously disposed in the extending direction of the cylindrical lenses at a constant pitch by having short sides of the pixel aperture sections opposing to each other by sandwiching light shielding regions that are provided at positions overlapping with pixel transistors.

15. A method for manufacturing a lens sheet which comprises a substrate and a plurality of cylindrical lenses arranged in parallel at a constant pitch on a flat surface of the substrate by having lens extending directions in parallel to each other, the method comprising:
disposing the cylindrical lenses neighboring to each other to be isolated from each other so as not to overlap one another; and
forming notch sections at one end part of a pitch direction of each of the cylindrical lenses from the one end part of the pitch direction of each of the cylindrical lenses towards other end part of the pitch direction in such a manner that the notch sections do not reach the other end part of the pitch direction of the cylindrical lenses, and a respective length of each of the notch sections in the lens pitch direction is greater than a corresponding length of each of the notch sections in a lens extending direction.

16. The method for manufacturing the lens sheet as claimed in claim 15, wherein
the notch sections of the cylindrical lenses are formed at least by avoiding mirror symmetrical positions in the cylindrical lenses.

17. The method for manufacturing the lens sheet as claimed in claim 15, wherein
the notch sections of the cylindrical lenses are formed at least not to be lined continuously on a same straight line on the flat surface of the substrate except the extending direction of the cylindrical lenses.

18. The method for manufacturing the lens sheet as claimed in claim 15, comprising
forming linear protrusions in areas between the cylindrical lenses or in the notch sections.

19. The method for manufacturing the lens sheet as claimed in claim 15, comprising
forming grooves by having areas between the cylindrical lenses and the notch sections as upper aperture sections.

20. The method for manufacturing the lens sheet as claimed in claim 19, wherein
the substrate is a multi-layer structure having at least a layer that is in contact with the cylindrical lenses and a base layer that is in contact with the cylindrical lens contact layer; and
the grooves are formed to go through the lens contact layer and reach at least into inside the base layer.

* * * * *